Jan. 17, 1933. W. O. WUEST 1,894,812
BATTERY PLATE FILLING MACHINE
Filed April 29, 1931
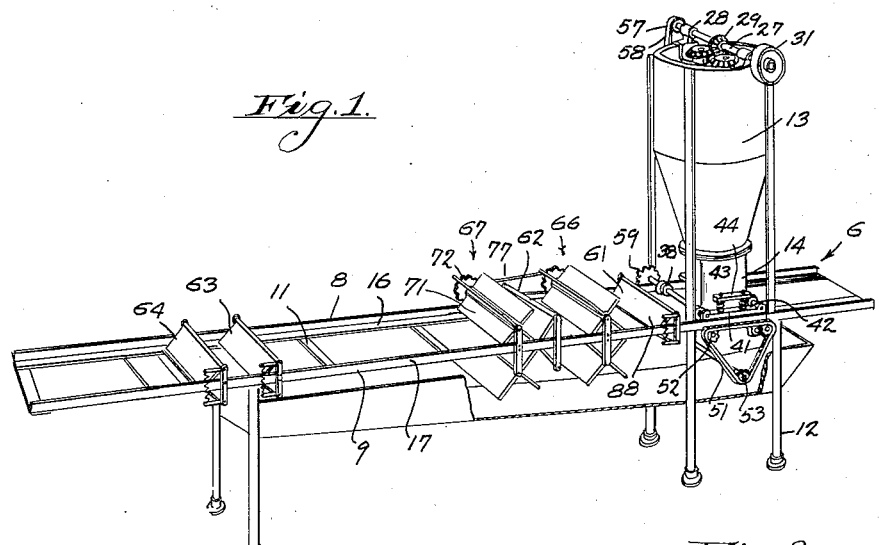
Fig. 1.
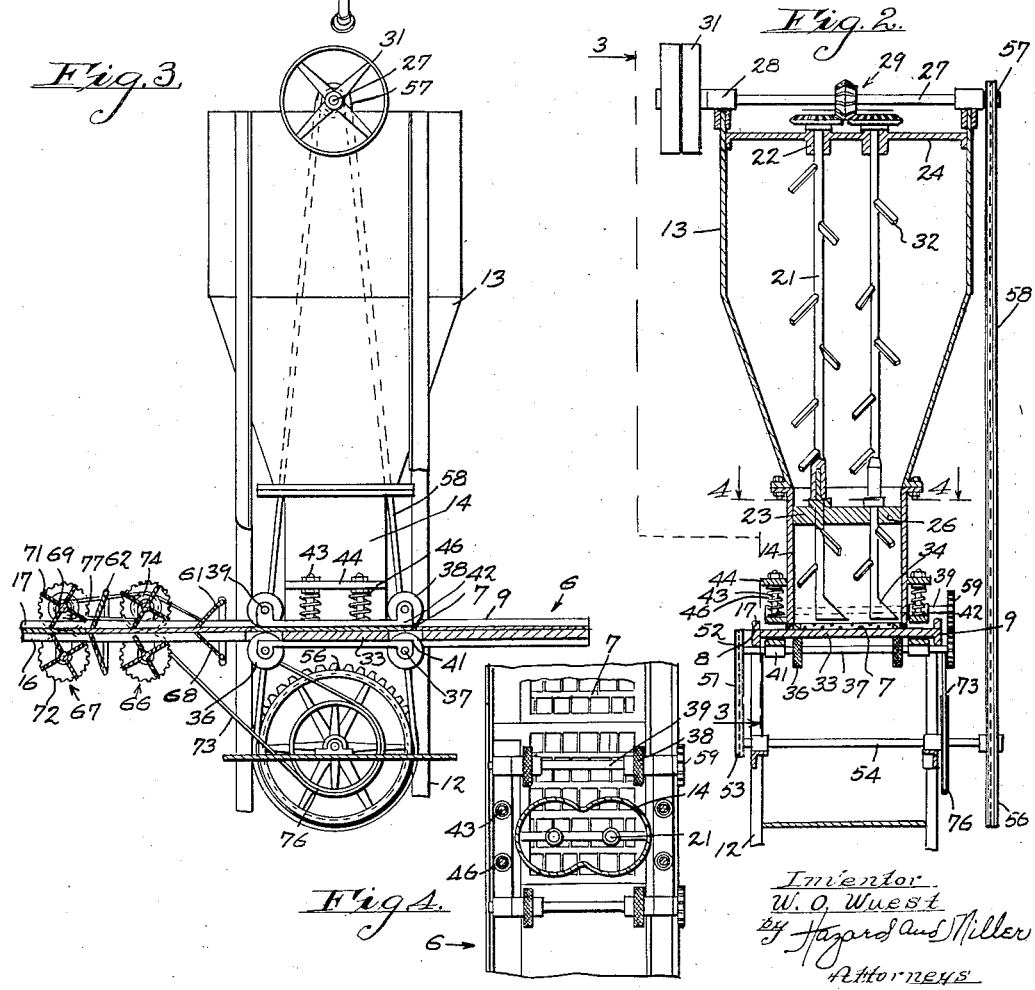
Fig. 3.
Fig. 2.
Fig. 4.
Inventor
W. O. Wuest
by Hazard and Miller
Attorneys Patented Jan. 17, 1933

1,894,812

UNITED STATES PATENT OFFICE

WILLIAM O. WUEST, OF VAN NUYS, CALIFORNIA

BATTERY PLATE FILLING MACHINE

Application filed April 29, 1931. Serial No. 533,726.

My invention is a machine for filling the grid plates commonly employed in storage batteries, with lead oxide, or more accurately peroxide of lead in paste form, and has for an object the provision of a machine of this general class which is adapted to perform the operation of filling the interstices of battery grid plates with the lead oxide at a much higher rate of speed than can be accomplished by hand.

Another object is to equip the machine with apparatus for compacting and smoothing the paste within the plates, so that the product of the machine is of as good or better quality, as compared with the plates to which the paste is applied by hand.

A further object is to provide a battery plate filling machine as described, which is of simple construction, and which, accordingly, is relatively inexpensive to manufacture, and yet which is capable of operating with a high degree of efficiency and at a relatively rapid rate in performing the functions for which it has been designed.

The invention possesses other objects and advantageous features, some of which, with those enumerated, will be set forth in the following description of the invention's particular embodiment which is illustrated in the drawing accompanying and forming a part of the specification.

Referring to the drawing:

Fig. 1 is a perspective view of a machine embodying the principles of the present invention.

Fig. 2 is a transverse vertical sectional view taken through the hopper and associated portions of the machine.

Fig. 3 is a compound longitudinal vertical sectional view taken upon the lines 3—3 of Fig. 2, with the direction of view as indicated. Portions of the figure are broken away to reduce its size.

Fig. 4 is a horizontal sectional view taken upon the line 4—4 of Fig. 2, with the direction of view as indicated. Portions of this figure also are broken away to reduce its size.

Specifically describing my improved battery plate filling machine in its preferred embodiment, it comprises a guideway 6, adapted to receive and support a plurality of grid plates 7 of the type commonly employed in the construction of storage batteries.

The guideway 6 preferably is in the form of opposed angle irons 8 and 9, extending longitudinally of the machine and retained in spaced, parallel relationship by means of transversely extending braces 11. The guideway 6 is supported through the expedient of a plurality of legs 12, there being two such legs adjacent one end of the guideway 6, and four adjacent the other end. These four legs extend for a material distance above the guideway 6, and serve as a support for a hopper 13 adapted to receive a quantity of the lead peroxide in paste form.

The hopper 13 terminates at its lower end in an outlet 14 spaced slightly above the plane of the horizontal flange 16 of the opposed angle irons 8 and 9, this spacing being substantially equal to the thickness of the battery plates which are to be filled by means of the machine. These plates 7 are supported at their side edges upon the horizontal flanges 16 which extend toward each other, as clearly shown upon Fig. 1. The vertically extending flanges 17 act as guides to prevent lateral motion of the plates as they move along the guideway 6.

Means are provided within the hopper 13 for forcing the paste downwards through the outlet 14 and pressing it into the interstices of the plates 7. Preferably a pair of shafts 21 are disposed vertically, being revolubly mounted in alined bearings 22 and 23 carried by upper and lower brackets 24 and 26, respectively, which are rigidly mounted within the hopper. These vertical shafts 21 are rotated by a transversely extending shaft 27 which is journaled in bearings 28 at the top of the hopper 13, and which is connected to the shafts 21 by means of bevel gears 29 or their equivalent. Power is applied to the transverse shaft 27 from any suitable source, and for this purpose pulleys 31 are provided thereupon. A plurality of helical plates 32 are provided upon each of the shafts 21, and so arranged that when they are rotated from the shaft 27, the motion of the plates 32 is such that they tend to force the paste downwards through the hopper 13 and outlet 14, and into the interstices of a grid plate 7 disposed immediately below the open lower end of the outlet 14. In order to prevent the material from being pressed clear through the plates 7, I prefer that the associated portion of the guideway 6 between the horizontal flanges 16 be closed by a transversely extending rigid plate 33.

The first operation of compacting and smoothing the paste within the plates 7 is performed by presser feet 34, in the form of a plate carried at the lower end of each of the shafts 21 in such position that it slides in a circular path upon the upper surface of each plate 7 which rests upon the rigid plate 33. The compacting action of the presser feet 34 is enhanced by inclining their leading edges slightly, so that their motion within the paste which is contained within the outlet 14 tends to force the paste downwards and into the interstices of the plate 7.

Instead of resting solely upon the rigid plate 33 while the paste is being pressed into the interstices, the grid plates 7 are also supported upon rollers 36 which are carried by transversely extending shafts 37 below the plane of the guideway 6, the parts being so proportioned and arranged that the upper edges of the rollers 36 lie within the plane of the upper surface of the rigid plate 33. These rollers are knurled at their edges, so that when they rotate in engagement with one of the grid plates 7 that plate will be advanced along the guideway 6. Cooperative with the rollers 36 are opposed rollers 38 which are carried by transverse shafts 39 which are disposed above the guideway 6 at such a distance that the lower edges of the rollers 38 are adapted to engage the upper surface of a grid plate, the lower surface of which is engaged by the rollers 36. Preferably, the upper rollers 38 also are knurled. Whereas the shafts 37 are journaled in lugs 41 which are rigid with the guideway 6, the upper shafts 39 are carried by shoes 42, one of which is arranged upon each side of the outlet 14. These shoes are retained against moving longitudinally of the guideway 6 by means of pins 43 which extend rigidly downwards from brackets 44 mounted upon the sides of the outlet 14, the lower ends of the pins 43 being seated within sockets in the upper surfaces of the shoes 42. Coil springs 46 encircling the pins 43 continually urge the shoes and the rollers 38 carried thereby, downwards toward the guideway 6, thereby causing them to press firmly against the upper surfaces of the grid plates 7, as the plates move past the outlet 14. In this manner, the shoes 42 are held sufficiently tightly against the plates to prevent leakage of the paste past the side edges of the outlet 14, and the grid plates 7 are gripped sufficiently firmly between the knurled rollers 36 and 38 to cause the grid plates to be advanced along the guideway when the rollers are turned.

Turning of the rollers 36 and 38 is accomplished by means of a chain 51 which engages sprockets 52 on the two lower shafts 37, and another sprocket 53 on a countershaft 54. This countershaft 54 carries a sprocket 56 which is connected to another sprocket 57 on the shaft 27 by means of a chain 58. The upper shafts 39 are connected to their respective lower shafts 37 by gears 59, as clearly shown upon Fig. 2.

As the grid plates 7 move out from under the outlet 14 with the interstices filled with the oxide in paste form, this paste, being of a relatively spongy nature, will tend to expand, causing it to bulge outwards from the faces of the plates. In order to press this bulging material back into the interstices, and thus compact the paste therein, and also to smooth the exposed surfaces of the paste, I provide sets of scraper blades 61, 62, 63 and 64, and also a pair of rotary beater paddles 66 and 67, with which the plates come into engagement after leaving the outlet 14 of the hopper 13. Each of the sets 61, 62, 63 and 64 of blades, comprises a pair of opposed plates 68 rigidly mounted with respect to the guideway 6 at an inclination with respect thereto and in such position that the edges of the plates 68 engage in scraping action the faces of the grid plates 7 as they move therepast. Inasmuch as the plates 68 of each set are in opposition to each other, the upper and lower surfaces of the plates are operated upon by the plates of each set simultaneously, thus avoiding the possibility of forcing the paste entirely through the plates, as might be possible if the plates 68 were not directly in opposition to each other, and in the event the grid plates 7 were so designed that their interstices extended entirely through the grid plates. Preferably, all the scraper plates 68 incline toward the guideway 6 and in the direction of movement of the grid plates 7 upon the guideway. Hence, the plates 68 tend to press the spongy paste back into the interstices of the plates, again tending to compact the paste, and also serve to scrape off any excess paste which does not, on account of the spongy nature of the paste, remain within the plates. The last two sets 63 and 64 preferably are at a material distance from the other sets, the purpose being to permit a material length of time to elapse before the plates engage the last two sets, thereby permitting the spongy paste to expand to its fullest extent before being again scraped off and compacted by the last two sets of inclined blades. The beater paddles 66 and 67 also are arranged in pairs, one paddle of each pair being above the guideway 6, and the other below. Moreover, the two paddles of each pair are arranged in opposition to each other, so that both operate upon the grid plates 7 simultaneously. Each paddle comprises a shaft 69 having a plurality of radiating blades 71 of flexible material, preferably relatively heavy sheet rubber. The upper and lower shafts 69 of each pair are interconnected by gears 72, so that the two shafts rotate at equal speed, but in opposite directions, and all the shafts 69 are rotated by means of a belt or chain 73 engaging a sprocket 74 on one of the shafts 69, and also another sprocket 76 carried by the countershaft 54. The second set 67 of beater paddles is connected to the first set 66 by means of a chain or belt 77. I prefer, however, that the sprocket or pulley whereby the chain 77 or belt, as the case might be, is connected to the shaft 69 of the second set 67, be of smaller diameter than that associated with the first set 66 of beater paddles, the purpose being to cause the second set to rotate at a faster speed.

Rotation of the beater paddles as the scraper plates 68 are moved therebetween, produces a patting effect because of the flexibility of the blades 71, and this patting serves to further compact the paste within the grid plates 7. The preferable arrangement is to position the second set 62 of scrapers between the sets 66 and 67 of beater paddles, and to leave a relatively wide space between the second set 67 of beaters and the third and fourth sets 63 and 64 of scraper blades.

Inasmuch as the operation of the various portions of the machine have been discussed hereinabove in connection with the description of their construction, it is not deemed necessary to describe the operation of the machine as a whole.

It is to be understood that the details of the invention as herein disclosed, are subject to alteration within the spirit or scope of the appended claims.

I claim:

1. A battery plate filling machine comprising a hopper, means for forcing paste from the bottom of the hopper, means providing a track beneath the hopper along which battery plates may pass, said track forming a closure beneath the hopper so that discharged paste will not continue to be forced through the plates positioned therebeneath, and spring pressed shoes at the sides of the hopper and extending the length of the hopper outlet adapted to engage the plates as they pass beneath the hopper to hold them against the track and prevent leakage of paste laterally.

2. A battery plate filling machine comprising a hopper, means for forcing paste from the bottom of the hopper, means providing a track beneath the hopper along which battery plates may pass, said track forming a closure beneath the hopper so that discharged paste will not continue to be forced through the plates positioned therebeneath, and spring pressed shoes at the sides of the hopper and extending the length of the hopper outlet adapted to engage the plates as they pass beneath the hopper to hold them against the track and prevent leakage of paste laterally, said shoes carrying rollers adapted to roll upon the plates.

3. A battery plate filling machine comprising a hopper, means for forcing paste from the bottom of the hopper, means providing a track beneath the hopper along which battery plates may pass, said track forming a closure beneath the hopper so that discharged paste will not continue to be forced through the plates positioned therebeneath, a pair of power driven rollers arranged on the track before and behind the hopper over which the plates pass, and spring urged rollers arranged before and behind the hopper urged into opposition to the power driven rollers, said spring urged rollers being connected by shoes extending parallel to the track adapted to engage the plates as they pass therebeneath to hold them against bending and prevent lateral leakage.

In testimony whereof I have signed my name to this specification.

W. O. WUEST.